United States Patent
Emanuel et al.

(10) Patent No.: US 12,080,089 B2
(45) Date of Patent: Sep. 3, 2024

(54) ENHANCING MACHINE TRANSLATION OF HANDWRITTEN DOCUMENTS

(71) Applicant: INTERNATIONAL BUSINESS MACHINES CORPORATION, Armonk, NY (US)

(72) Inventors: Barton Wayne Emanuel, Manassas, VA (US); Nadiya Kochura, Bolton, MA (US); Su Liu, Austin, TX (US); Tetsuya Shimada, Seattle, WA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 363 days.

(21) Appl. No.: 17/643,227

(22) Filed: Dec. 8, 2021

(65) Prior Publication Data
US 2023/0177858 A1 Jun. 8, 2023

(51) Int. Cl.
*G06V 30/414* (2022.01)
*G06F 16/93* (2019.01)
(Continued)

(52) U.S. Cl.
CPC ............ *G06V 30/414* (2022.01); *G06F 16/93* (2019.01); *G06F 40/58* (2020.01); *G06V 30/22* (2022.01); *G06V 30/413* (2022.01)

(58) Field of Classification Search
None
See application file for complete search history.

(56) References Cited

U.S. PATENT DOCUMENTS

| 8,320,674 B2 | 11/2012 | Guillou |
| 9,117,125 B2 | 8/2015 | Demiya |

(Continued)

FOREIGN PATENT DOCUMENTS

| IN | 36872013 A | 7/2015 |
| JP | 6545112 B2 | 7/2019 |
| RU | 2609069 C2 | 1/2017 |

OTHER PUBLICATIONS

Benjdira et al., "Unsupervised Domain Adaptation Using Generative Adversarial Networks for Semantic Segmentation of Aerial Images," MDPI, Remote Sens. 2019, 11(11), 1369; https://doi.org/10.3390/rs11111369, Published: Jun. 7, 2019, 23 pages.

(Continued)

*Primary Examiner* — Andrew H Lam
(74) *Attorney, Agent, or Firm* — Elliot J. Shine (57) ABSTRACT

A computer-implemented method, a computer system and a computer program product enhance machine translation of a document. The method includes capturing an image of the document. The document includes a plurality of characters that are arranged in a character layout. The method also includes classifying the image by a document type based on the character layout. The method further includes determining a strategy for an intelligent character recognition (ICR) algorithm with the image based on the character layout of the image. Lastly, the method includes generating a translated document by applying the intelligent character recognition (ICR) algorithm to the plurality of characters in the image using the strategy. The translated document includes a plurality of translated characters that are arranged in the character layout.

20 Claims, 5 Drawing Sheets

(51) Int. Cl.
*G06F 40/58* (2020.01)
*G06V 30/22* (2022.01)
*G06V 30/413* (2022.01)

(56) References Cited

U.S. PATENT DOCUMENTS

| | | | |
|---|---|---|---|
| 10,460,040 B2 | 10/2019 | Eck | |
| 2012/0088543 A1* | 4/2012 | Lindner | G06F 40/58 704/260 |
| 2017/0371866 A1* | 12/2017 | Eck | G06F 40/49 |
| 2021/0110205 A1* | 4/2021 | Karimi | G06V 30/32 |

OTHER PUBLICATIONS

Brownlee, "How to Develop a Pix2Pix GAN for Image-to-Image Translation," Machine Learning Mastery, Aug. 2, 2019 in Generative Adversarial Networks, https://machinelearningmastery.com/how-to-develop-a-pix2pix-gan-for-image-to-image-translation/, 91 pages.

Mell et al., "The NIST Definition of Cloud Computing", National Institute of Standards and Technology, Special Publication 800-145, Sep. 2011, 7 pages.

* cited by examiner

ENHANCING MACHINE TRANSLATION OF HANDWRITTEN DOCUMENTS

BACKGROUND

Embodiments relate generally to translation of documents, and more specifically to enhancing machine recognition of documents that are handwritten in character-based foreign languages.

It may be common for a traveler in a foreign country who may be unfamiliar with the language to need a translation of a document, such as a menu in a restaurant or a guidebook in a museum or tourist attraction. It may also be possible to capture an image of the document with a smartphone or other mobile device and receive a translation with a software application. In such an application, a computer may understand the foreign language and the formal rules that govern structure and grammar. However, documents that may be handwritten may have the characters laid out in ways that are not covered by the formal rules and therefore, the character layout of the document may be critical to optimum machine translation of the document.

SUMMARY

An embodiment is directed to a computer-implemented method for enhancing machine translation of a document. The method may include capturing an image of the document. The document may include a plurality of characters that are arranged in a character layout. The method may also include classifying the image by a document type based on the character layout. The method may further include determining a strategy for an intelligent character recognition (ICR) algorithm with the image based on the character layout of the image. Lastly, the method may include generating a translated document by applying the intelligent character recognition (ICR) algorithm to the plurality of characters in the image using the strategy. The translated document may include a plurality of translated characters that are arranged in the character layout.

In another embodiment, the method may include using a machine learning classification model to predict the document type based on the character layout.

In a further embodiment, the method may include identifying each of the plurality of characters within the document. The method may also include determining a confidence level for applying the intelligent character recognition (ICR) algorithm to the identified character. The method may further include displaying an output of the intelligent character recognition algorithm for the identified character to a user in response to the confidence level below a threshold. In addition, the method may include monitoring user interactions with the output. Lastly, the method may include updating the translated document according to the monitored user interactions.

In yet another embodiment, determining the strategy for the intelligent character recognition (ICR) algorithm may include re-arranging the plurality of characters from the character layout of the document to an optimum character layout for machine translation.

In another embodiment, generating the translated document may include comparing an output of the intelligent character recognition (ICR) algorithm to a database. In this embodiment, generating the translated document may also include updating the translated document based on the prior translation in response to the output matching a prior translation in the database.

In a further embodiment, generating the translated document may include displaying the translated document to a user. In this embodiment, generating the translated document may also include receiving an interaction record from the user. In this embodiment, generating the translated document may further include associating the interaction record with the translated document. Lastly, in this embodiment, generating the translated document may include storing the interaction record with the associated translated document in a database.

In an embodiment, each of the plurality of characters may be handwritten.

In addition to a computer-implemented method, additional embodiments are directed to a system and a computer program product for enhancing machine translation of a document.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In the course of foreign travel, it may be common to experience several moments where translation of written documents is necessary. For instance, when passing by a restaurant, a diner may wish to know what is on the menu for that day and there may be no version of the menu available in the diner's native language. While images of the dishes may be available or another way to express the offerings, the diner may be forced to find a translation of the menu themselves. With the proliferation of mobile devices in the modern world that may be equipped with cameras, and as those devices increase their capabilities, the use of translation applications may become more popular. Such an application may allow a user to hold the mobile device to the menu and capture an image, which may then be processed by a translation application running on the mobile device. A translation may then be displayed on the screen of the mobile device, or in some cases, the translation may be overlaid on the original text in the actual image, such that it may appear to the user that the original menu is written in the native language.

However, a problem that may arise in this context is that different types of documents, and different languages, have different layouts that must be taken into account. This may be especially true in the context of Western travelers in Asian countries, e.g., Korea, Japan or China. This is because the local language may be character-based and the characters may be arranged in various ways, while most Western languages use a Latin alphabet with characters written from left to right. In addition, it may be common for a menu in the Chinese language to arrange the characters in rows and columns that may be difficult for an intelligent character recognition (ICR) algorithm, which may be used by an application to read and understand the document, to operate.

Therefore, it may be advantageous to provide a method and system for enhancing the machine translation of documents by initially learning and understanding the layout of a document and then applying a corresponding strategy to an ICR algorithm such that the characters within the document may be arranged into a layout that simplifies the translation process. Such a method may also assemble the translated text into a form that may be understandable to the user that may be seeking the translation. Such a method may also save translations into a database for use as further training data for a supervised machine learning model or for other users such that, if a specific menu is recognized as having been translated before, a translation in the required language may be instantly accessed and displayed to the user. Also, as translations are completed, they may be presented to the user that may be seeking the translation for feedback to determine if the translation is correct or needs adjustment. Such adjustments or feedback may also be used to update and refine both the translation and the classification of documents by type, e.g., menu or guidebook, or by layout. A method such as that disclosed herein may improve the comprehensibility of instant translations that may be provided by translation software on mobile devices and also increase the scope of languages that may be covered by the translation applications, which may not be able to handle language pairs that have highly disparate layouts and formats.

Figure 1:
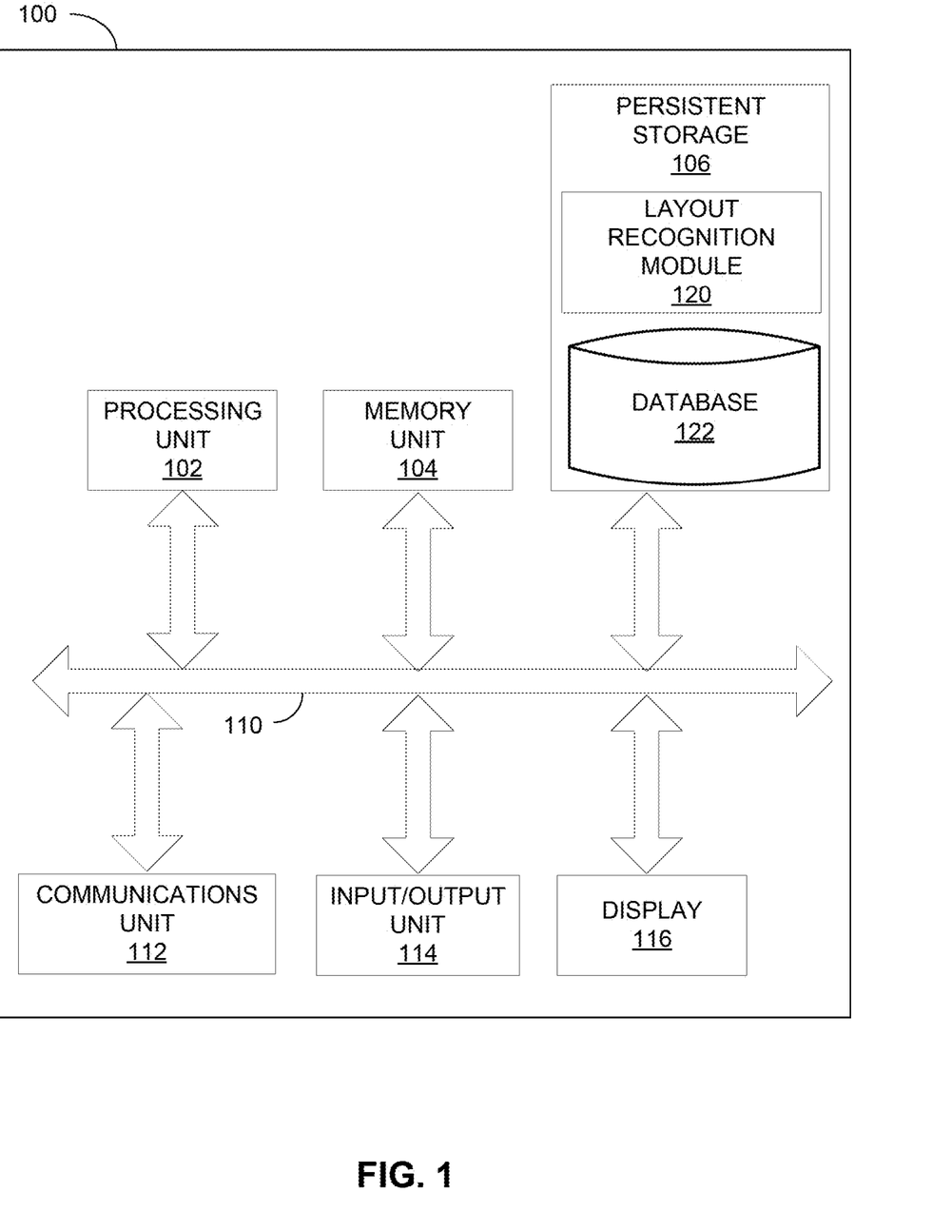
FIG. 1 is a block diagram of an example computer system in which various embodiments may be implemented.

Referring now to FIG. 1, there is shown a block diagram illustrating a computer system 100 in accordance with an embodiment. It should be appreciated that FIG. 1 provides only an illustration of one implementation and does not imply any limitations with regard to the environments in which different embodiments may be implemented. Many modifications to the depicted environments may be made based on design and implementation requirements.

As shown, a computer system 100 includes a processor unit 102, a memory unit 104, a persistent storage 106, a communications unit 112, an input/output unit 114, a display 116, and a system bus 110. Computer programs such as the user interface modification module 120 may be stored in the persistent storage 106 until they are needed for execution, at which time the programs are brought into the memory unit 104 so that they can be directly accessed by the processor unit 102. The processor unit 102 selects a part of memory unit 104 to read and/or write by using an address that the processor unit 102 gives to memory unit 104 along with a request to read and/or write. Usually, the reading and interpretation of an encoded instruction at an address causes the processor unit 102 to fetch a subsequent instruction, either at a subsequent address or some other address. The processor unit 102, memory unit 104, persistent storage 106, communications unit 112, input/output unit 114, and display 116 interface with each other through the system bus 110.

Examples of computing systems, environments, and/or configurations that may be represented by the data processing system 100 include, but are not limited to, personal computer systems, server computer systems, thin clients, thick clients, hand-held or laptop devices, multiprocessor systems, microprocessor-based systems, network PCs, mini-computer systems, and distributed cloud computing environments that include any of the above systems or devices.

Each computing system 100 may also include a communications unit 112 such as TCP/IP adapter cards, wireless Wi-Fi interface cards, or 3G or 4G wireless interface cards or other wired or wireless communication links. Communication between mobile devices may be accomplished via a network and respective network adapters or communication units 112. In such an instance, the communication network may be any type of network configured to provide for data or any other type of electronic communication. For example, the network may include a local area network (LAN), a wide area network (WAN), a virtual private network (VPN), a mobile or cellular telephone network, the Internet, or any other electronic communication system. The network may use a communication protocol, such as the transmission control protocol (TCP), the user datagram protocol (UDP), the internet protocol (IP), the real-time transport protocol (RTP) the Hyper Text Transport Protocol (HTTP), or a combination thereof.

Figure 2:
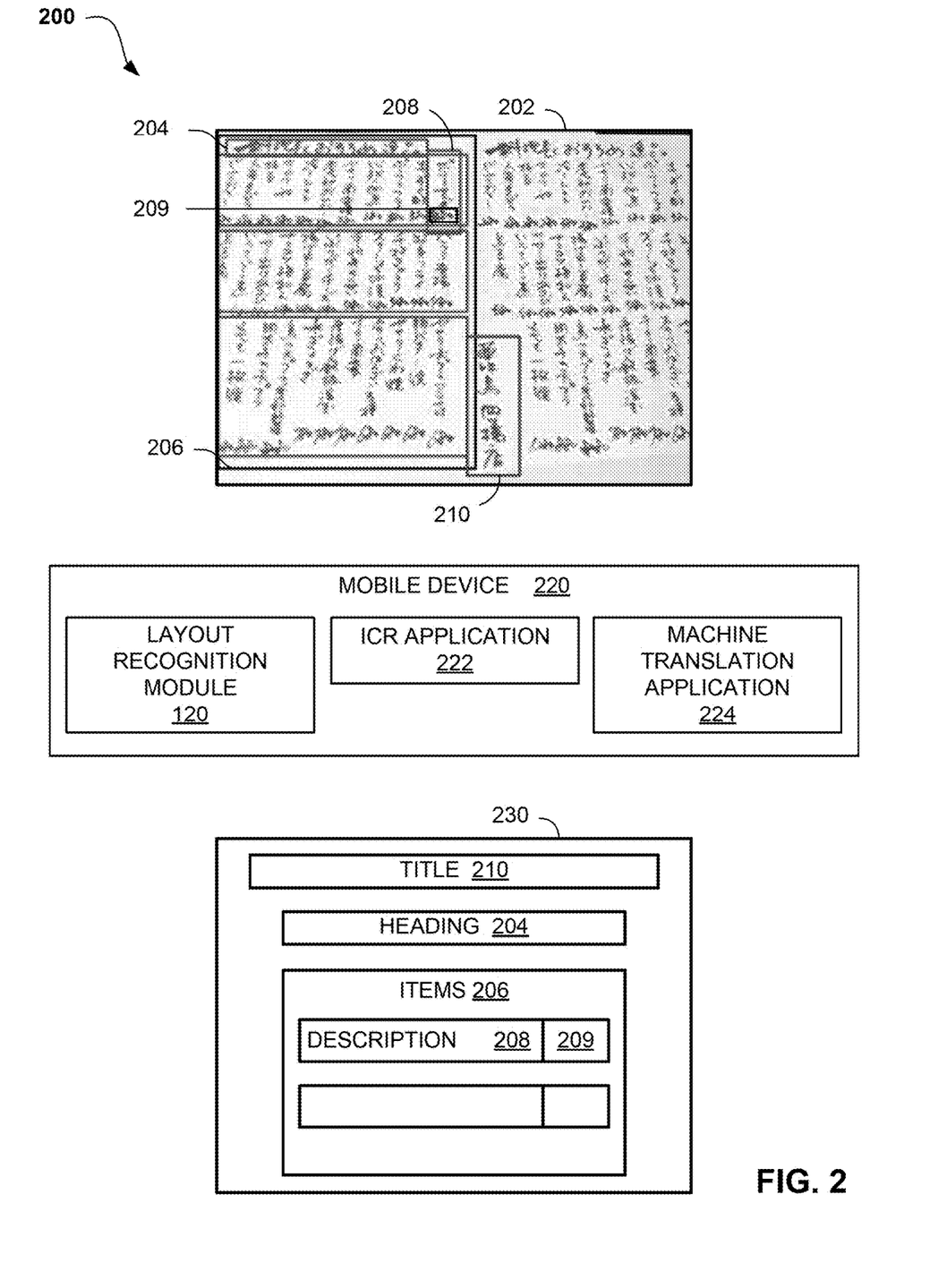
FIG. 2 shows an example of an environment where a handwritten restaurant menu may be translated using an image from a mobile device and various algorithms according to an embodiment.

Referring to FIG. 2, an example 200 is shown in FIG. 2 of an environment where a handwritten restaurant menu may be translated using an image from a mobile device and various algorithms. The menu 202 is shown in the source language with the characters arranged in a layout that may be common in Japanese but would also not be generally recognizable to a foreign traveler (as a speaker of another native language) and may be problematic for a machine translation application.

In the example of FIG. 2, a foreign traveler, or any user, may capture an image of the menu 202 using their mobile device 220. Mobile device 220 may have several programs loaded and running, including layout recognition module 120 and also Intelligent Character Recognition (ICR) application 222 and machine translation application 224. It should be noted that while the example of FIG. 2 depicts the modules as separate applications, this is not required. These modules may be combined into modules that perform one or more of these functions. In addition, any portion of the services that may be provided by the mobile device, including the functions described as a part of FIG. 2, may be provided by software applications that may be loaded and running on remote servers, including the cloud, and connected to the mobile device via a network, e.g., the Internet.

In the captured image of FIG. 2, the title 210 for the menu, e.g., the name of the restaurant or any title that may be used, is located in the bottom center of the menu with the characters aligned vertically from top to bottom. The menu items 206 within the image are shown with the characters laid out in three rows and a heading 204 at the top that all read left to right. The rows contain description information 208 of the food items on the menu 202 and consist of characters running vertically top to bottom containing item details and at the bottom, Western numerals are used to indicate a price 209 that does not include any currency indicator, e.g., symbol for yen or dollars or other local currency, depending on implementation of the machine translation application 224.

The captured image in the mobile device may be classified by type based on the layout and also the layout of the characters in the image. The menu 202 may be checked against a database, e.g., database 122, to determine if the document may have been encountered before, in which case it may be known that the document is a restaurant menu in Japanese and a translation may already exist for the menu. If a similar document is not found in the database, then the character layout may be logged and the image may be classified by type, e.g., menu in Japanese, and also the specific character layout, e.g., vertical title, rows of vertical characters where the heading and rows run left to right, etc., may be included in the information that may be stored about the classified image and document. One of ordinary skill in the art may recognize that several pieces of information may be stored as metadata associated with the classified image in the database. This may include rating information about the items at the restaurant, which may take the form of a numeric rating or a "like" on social media or even text reviews from past diners at the restaurant. Such information that may form an "interaction record", or a record of how a user may interact with the information about the items on the menu. It is not required for there to be an organized "interaction record", only that any information that connects a user to a translation may be collected and stored in association with the translation for possible later use. In addition, information about how to translate certain characters may also be stored that may be used by the machine translation algorithm, e.g., machine translation application 224, to refine its translation of the characters.

Once the character layout is known, a strategy that may allow an intelligent character recognition (ICR) algorithm, e.g., ICR application 222, to read the characters may be determined. This strategy may be directed by the character layout of the menu 202, such that the algorithm may begin by reading the title vertically, then the heading at the top from the left to right, and then each item one by one vertically beginning with the description and down to the price. Using the determined strategy, the ICR algorithm may read the characters and re-arrange what is read into a layout that may be more optimal for machine translation. For instance, the characters may be re-formatted to form a string running left to right that may be processed by a machine translation algorithm, e.g., machine translation application 224, more efficiently than searching around the captured image. The machine translation algorithm may then translate the characters into a target language, which in the example of FIG. 2 is English.

A translated document 230 may be generated by the algorithm, either as a new document or as a display on the mobile device. The output of the machine translation algorithm, e.g., the characters within translated document 230, may be arranged in a layout that is most suitable for the user on the device. While the characters may be arranged as they are in the captured image if the goal is to overlay the translation on the captured image, this is not required. The classification of the image, e.g., menu, may be combined with the target language, e.g., English, to assemble the translated characters into a new character layout that more closely reflects a standard menu in English, e.g., the title 210 may be placed at the top of the document with heading 204 beneath the title. The three rows of items 206 may be preserved but the item description information 208 may be arranged with the description left to right and the individual items running top to bottom, as opposed to the left to right layout of the captured image, with pricing at the far right of the page instead of on the bottom, as indicated by the price 209. It should be noted that in FIG. 2, the reference numerals indicate that the information being conveyed in both the source and target languages is the same, though translated. In other words, the name of the item and description of the contents of the item is intended to be the same and an accurate translation of the source language into the target language. However, it is to be understood that these depictions will not be identical as the source language may be character-based, such as Japanese, and the target language may be English or another Western language.

Figure 3:
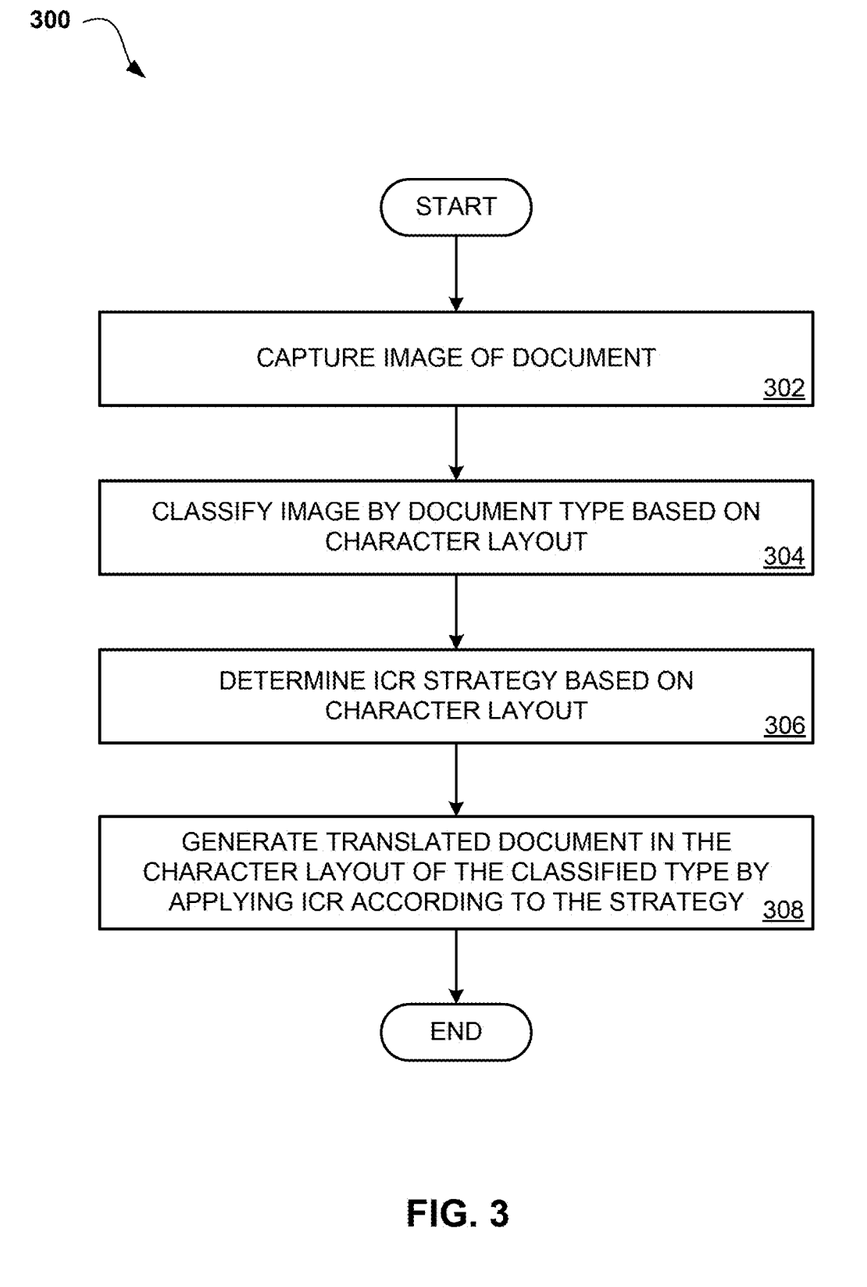
FIG. 3 is a flow chart diagram of a process to enhance machine translation of handwritten documents in accordance with one or more embodiments.

Referring to FIG. 3, an operational flowchart illustrating a process 300 for enhancing machine translation of handwritten documents is depicted according to at least one embodiment. At 302, an image of a document may be captured using a device, e.g., camera as part of a mobile device or any other device that may capture images. The document in the image may be any written material for which a user would like a translation, e.g., a menu if the user is in a restaurant or a sign near a street or a flyer that has been handed to the user. It is not specifically required for the document to be handwritten, only that the characters are displayed such that the layout of the characters may be determined in the next step. Also, one of ordinary skill in the art would recognize that a document is not required to be a single page or single digital file, it is only required that an image include text intended to be translated to a foreign language.

At 304, the image may be classified by document "type" based on the layout of the characters. Examples of document "types" include restaurant menus or academic papers or product manuals or street signs or any other type of written material that may be organized within an image and sent to a machine for translation. Classifying the image by type may assist with arranging the characters that will be generated by the translation, such that the output is in a form that may make sense to a user. The document type may be identified by the layout of the characters, such as the columns for the descriptions in the example of FIG. 2, where a price that includes numerals and a currency indicator appears at the end of the description. The type may also be determined by the text in the image. For instance, if a title were read and understood and then matched to a restaurant in a database, the document may be classified as a menu from that restaurant. In another example, in an academic paper, it may be customary for an abstract to appear at the beginning of the text so if the word "abstract" were detected, the document may be classified as an academic paper. In a further example, the appearance of author names near a title within the image may indicate to a classifier that the document is a book or article.

In an embodiment, a supervised machine learning classification model may be trained to predict the type of document based on the layout of the characters that may be detected in the image. For instance, a restaurant menu in a language such as English may be expected to have a title that may indicate the name of the restaurant and then one or more columns of information. The menu may have names of the dishes on the left, for example, with some descriptive information below the name, and a price on the right. From this general layout of the characters within the words on the screen, it may be determined that the document type is a menu. It should also be noted that the language of the document may be taken into account in determining the type. For example, a menu in another language may convey the same information as the prior menu but the characters may be arranged such that the name is in a different position and the characters read from right to left or perhaps vertically.

One or more of the following machine learning algorithms may be used: logistic regression, naive Bayes, support vector machines, deep neural networks, random forest, decision tree, gradient-boosted tree, multilayer perceptron, and one-vs-rest. In an embodiment, an ensemble machine learning technique may be employed that uses multiple machine learning algorithms together to assure better prediction when compared with the prediction of a single machine learning algorithm. In this embodiment, training data for the model may include several documents, e.g., menus or other documents described above, in a variety of languages and from a variety of sources. For each of these documents, the character layout may be learned by the model to refine its prediction of document type. The classification results may be stored in a database so that the data is most current, and the output would always be up to date.

At 306, an intelligent character recognition (ICR) strategy may be determined based on the character layout of the image. Intelligent character recognition (ICR), as an advanced optical character recognition (OCR) algorithm, may allow handwritten characters to be recognized and converted by a computer into computer-readable text. Depending on the layout of the characters in the classified image, the algorithm may need to read the characters in a specific way and may also re-arrange the characters that are read into a layout that is most efficient for the purposes of the machine translation. Examples of character layouts requiring different strategies may include the use of a title at the top that consists of characters read left to right and two vertical columns that may be read from left to right with respect to each other and consisting of characters that may be read from left to right. In this example, a strategy for the algorithm may be to first determine the overall page structure described above, then read the title, followed by determining the structure for the first column, then reading the characters in the first column and proceeding to the second column once all the characters are processed. Such a strategy may repeat the process for the second column and complete the processing of the entire page.

Other examples of character layouts and alternate strategies may include the use of characters that read right to left or characters that may be arranged vertically. In addition, the title of the page may not be on the top but positioned on either side of the columns of text or may also be between the rows and columns of text. In these alternate layouts, the ICR algorithm may need to adjust how it reads the characters within the image based on where the characters may be positioned on the page. There may also be instances where the text may not be arranged in columns.

At 308, a translated document may be generated by applying ICR according to the determined strategy and then applying a machine translation algorithm from the source language to the target language. In between the application of these algorithms, it may be necessary to transform the character layout of the classified image using the strategy that may be determined in step 306 into a character layout that the machine translation algorithm may understand. To accomplish this transformation, a generative adversarial network (GAN) may be used. In a GAN architecture, two models may be used: a generator model that may output new plausible synthetic images and a discriminator model that may classify images as real or synthetic. In such an architecture, the two models may be trained simultaneously in an adversarial fashion such that the generator seeks to fool the discriminator with improved synthetic images and the discriminator seeks to improve its detection of synthetic images, and thus improve its classification model. Over time, the architecture may refine its ability to recognize various character layouts and transform the layout into one that is most efficient for the machine translation algorithm.

It should be noted that users or other humans may assist with the machine translation process if necessary. The machine translation algorithm, e.g., machine translation application 224, may determine a confidence level in the translation through a score, which the algorithm may transmit to users. Low confidence may indicate to the user that assistance may be needed in the translation process. Both the source characters and output of the machine translation algorithm may be provided to a user for assistance through confirmation or correction of the machine translation of the source characters. This confirmation or correction by the user may strengthen the quality of the translation and the results, along with an indication of confirmation or corrected text, may be saved into a database along with the translated document.

Once the text is translated into the target language, the text of the translation may be arranged into the character layout corresponding to the document type. As an example, if the source document is a menu at a restaurant, the text of the translation may be arranged into a layout that may be common for menus in the target language, even if the layout may not be the same as the original text in the classified image. In such an example, it may be common for menus in restaurants in Japan to use characters that are arranged vertically, while in the United States, the words may be arranged in columns that may be read left to right. If the translation is from Japanese to English, then the translation may be laid out in the manner that may be common in the United States as opposed to Japan, even if the user is in Japan.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
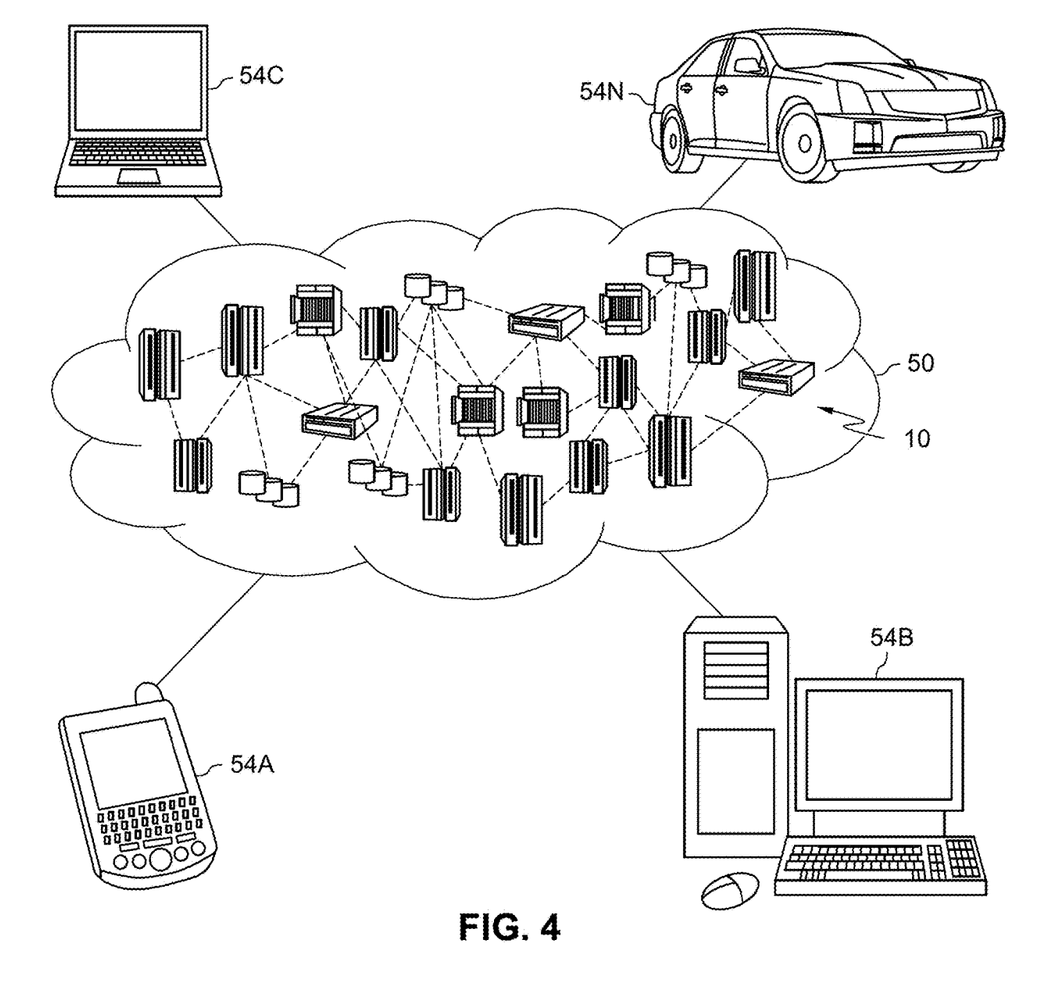
FIG. 4 depicts a cloud computing environment according to an embodiment.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
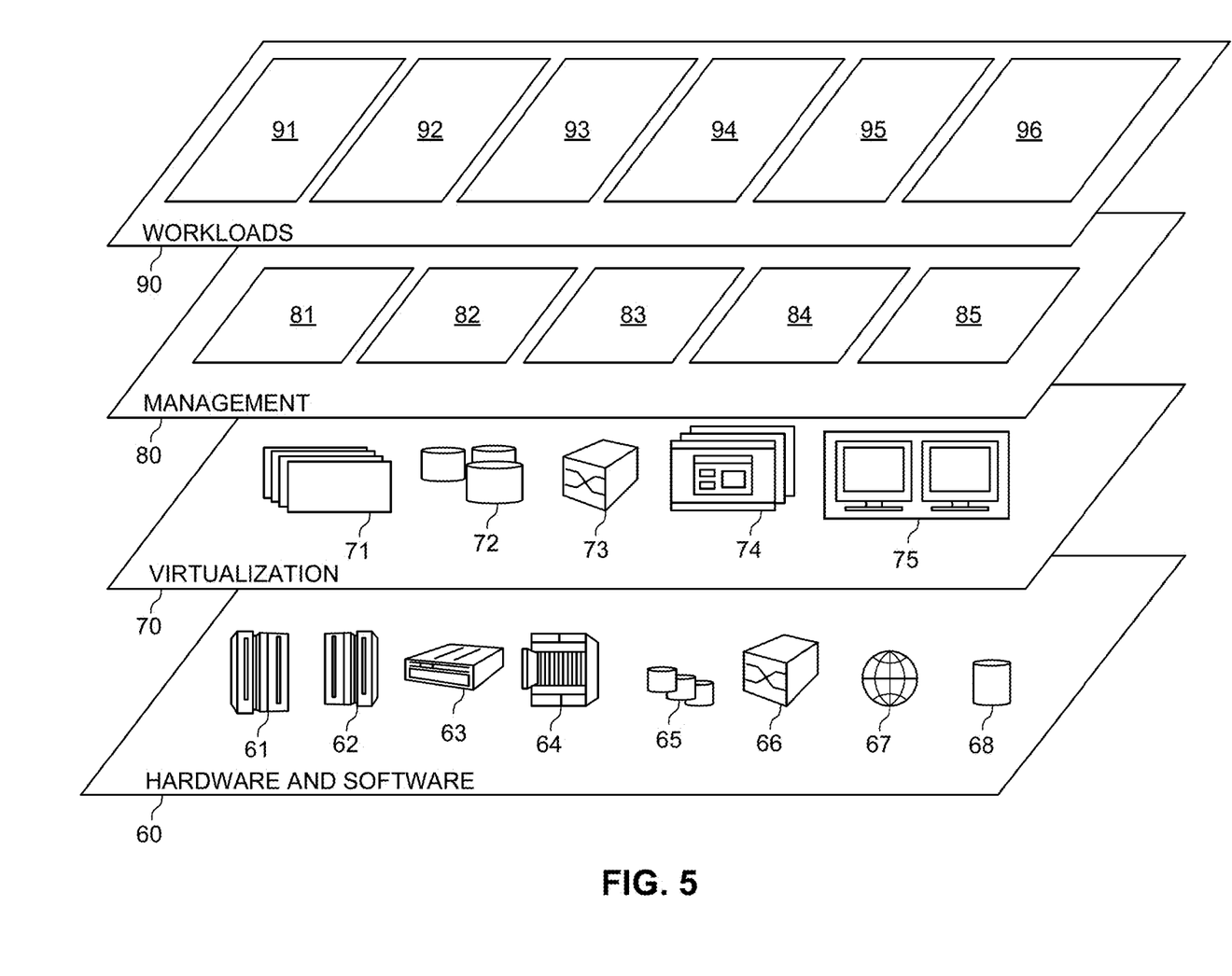
FIG. 5 depicts abstraction model layers according to an embodiment.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66, such as a load balancer. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and machine translation enhancement 96. Machine translation enhancement may refer to detecting the character layout of a document and using the information to determine a strategy for applying an intelligent character recognition algorithm to the characters for developing an enhanced translation of the document.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for enhancing machine translation of a document, the method comprising:
    capturing an image of the document, wherein the document includes a plurality of characters that are arranged in a character layout;
    classifying the image by a document type using a machine learning classification model based on the character layout, wherein the machine learning classification model is trained using a plurality of training documents stored in a knowledge corpus;
    determining a strategy for an intelligent character recognition (ICR) algorithm with the image based on the character layout; and
    generating a translated document by applying the intelligent character recognition (ICR) algorithm to the plurality of characters in the image using the strategy, wherein the translated document includes a plurality of translated characters that are arranged in the character layout.

2. The computer-implemented method of claim 1, further comprising:
    identifying each of the plurality of characters within the document;
    receiving a confidence level from a machine translation algorithm for the identified character;
    in response to the confidence level below a threshold, displaying an output of the machine translation algorithm for the identified character to a user;
    monitoring user interactions with the output; and
    updating the translated document according to the monitored user interactions.

3. The computer-implemented method of claim 1, wherein determining the strategy for the intelligent character recognition (ICR) algorithm includes re-arranging the plurality of characters from the character layout of the document to an optimum character layout for machine translation.

4. The computer-implemented method of claim 1, wherein generating the translated document further comprises:
    comparing an output of the intelligent character recognition (ICR) algorithm to a database; and
    in response to the output matching a prior translation in the database, updating the translated document based on the prior translation.

5. The computer-implemented method of claim 1, wherein generating the translated document further comprises:
    displaying the translated document to a user;
    receiving an interaction record from the user;
    associating the interaction record with the translated document; and
    storing the interaction record with the associated translated document in a database.

6. The computer-implemented method of claim 1, wherein each of the plurality of characters are handwritten.

7. The computer-implemented method of claim 1, wherein the document type is classified by the machine learning classification model based on at least the character layout and a text within the image.

8. The computer-implemented method of claim 1, wherein the machine learning classification model additionally leverages a language of the text within the image in classifying the image by the document type.

9. The computer-implemented method of claim 1, wherein the plurality of characters in the image are re-arranged based on the document type prior to generating the translated document.

10. A computer system for enhancing machine translation of a document, the system comprising:
    one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
        capturing an image of the document, wherein the document includes a plurality of characters that are arranged in a character layout;
        classifying the image by a document type using a machine learning classification model based on the character layout, wherein the machine learning classification model is trained using a plurality of training documents stored in a knowledge corpus;
        determining a strategy for an intelligent character recognition (ICR) algorithm with the image based on the character layout; and
        generating a translated document by applying the intelligent character recognition (ICR) algorithm to the plurality of characters in the image using the strategy,
        wherein the translated document includes a plurality of translated characters that are arranged in the character layout.

11. The computer system of claim 10, further comprising:
    identifying each of the plurality of characters within the document;
    receiving a confidence level from a machine translation algorithm for the identified character;
    in response to the confidence level below a threshold, displaying an output of the machine translation algorithm for the identified character to a user;
    monitoring user interactions with the output; and
    updating the translated document according to the monitored user interactions.

12. The computer system of claim 10, wherein determining the strategy for the intelligent character recognition (ICR) algorithm includes re-arranging the plurality of characters from the character layout of the document to an optimum character layout for machine translation.

13. The computer system of claim 10, wherein generating the translated document further comprises:
    comparing an output of the intelligent character recognition (ICR) algorithm to a database; and
    in response to the output matching a prior translation in the database, updating the translated document based on the prior translation.

14. The computer system of claim 10, wherein generating the translated document further comprises:
    displaying the translated document to a user;
    receiving an interaction record from the user;
    associating the interaction record with the translated document; and
    storing the interaction record with the associated translated document in a database.

15. The computer system of claim 10, wherein each of the plurality of characters are handwritten.

16. A computer program product for enhancing machine translation of a document comprising:
  a computer readable storage device having program instructions embodied therewith, the program instructions executable by a processor to cause the processor to perform a method comprising:
    capturing an image of the document, wherein the document includes a plurality of characters that are arranged in a character layout;
    classifying the image by a document type using a machine learning classification model based on the character layout, wherein the machine learning classification model is trained using a plurality of training documents stored in a knowledge corpus;
    determining a strategy for an intelligent character recognition (ICR) algorithm with the image based on the character layout; and
    generating a translated document by applying the intelligent character recognition (ICR) algorithm to the plurality of characters in the image using the strategy, wherein the translated document includes a plurality of translated characters that are arranged in the character layout.

17. The computer program product of claim 16, further comprising:
  identifying each of the plurality of characters within the document;
  receiving a confidence level from a machine translation algorithm for the identified character;
  in response to the confidence level below a threshold, displaying an output of the machine translation algorithm for the identified character to a user;
  monitoring user interactions with the output; and
  updating the translated document according to the monitored user interactions.

18. The computer program product of claim 16, wherein determining the strategy for the intelligent character recognition (ICR) algorithm includes re-arranging the plurality of characters from the character layout of the document to an optimum character layout for machine translation.

19. The computer program product of claim 16, wherein generating the translated document further comprises:
  comparing an output of the intelligent character recognition (ICR) algorithm to a database; and
  in response to the output matching a prior translation in the database, updating the translated document based on the prior translation.

20. The computer program product of claim 16, wherein generating the translated document further comprises:
  displaying the translated document to a user;
  receiving an interaction record from the user;
  associating the interaction record with the translated document; and
  storing the interaction record with the associated translated document in a database.

* * * * *